June 21, 1938.  F. W. MARCO  2,121,252
TIRE RETREADING MACHINE
Filed Nov. 23, 1936   3 Sheets-Sheet 1

INVENTOR
Fred William Marco
BY
Harry B Schweder
ATTORNEY

June 21, 1938.　　　　F. W. MARCO　　　　2,121,252
TIRE RETREADING MACHINE
Filed Nov. 23, 1936　　　3 Sheets-Sheet 2
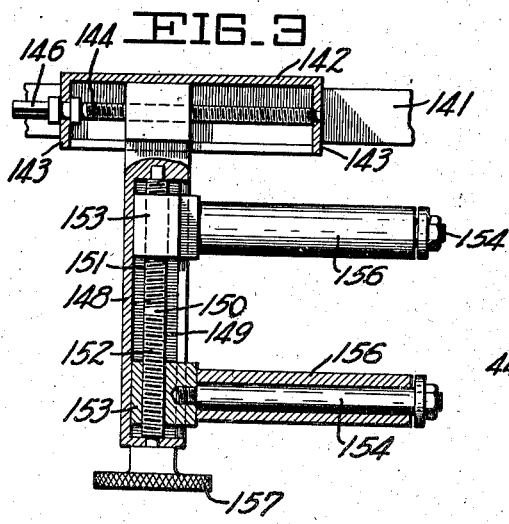
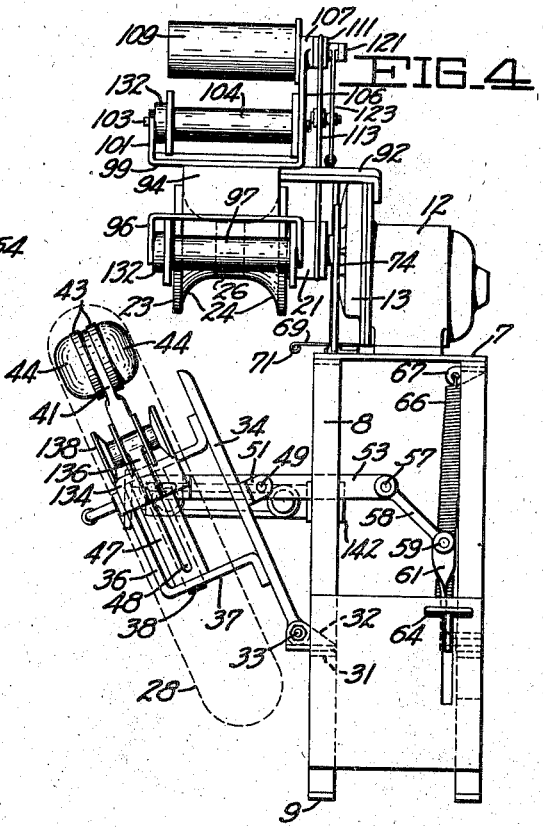
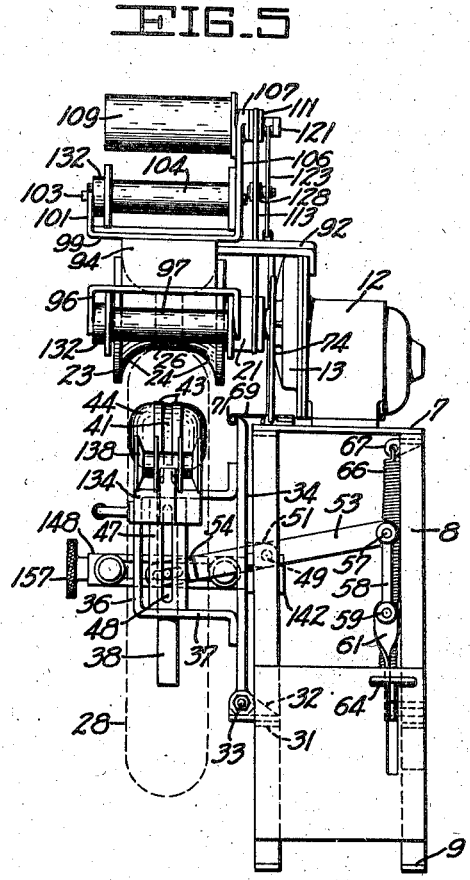
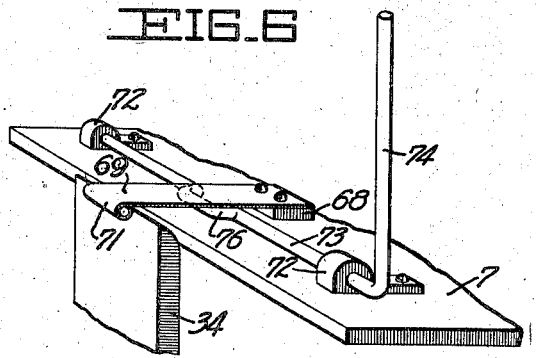
INVENTOR
Fred William Marco
BY
Harry C. Schroeder
ATTORNEY

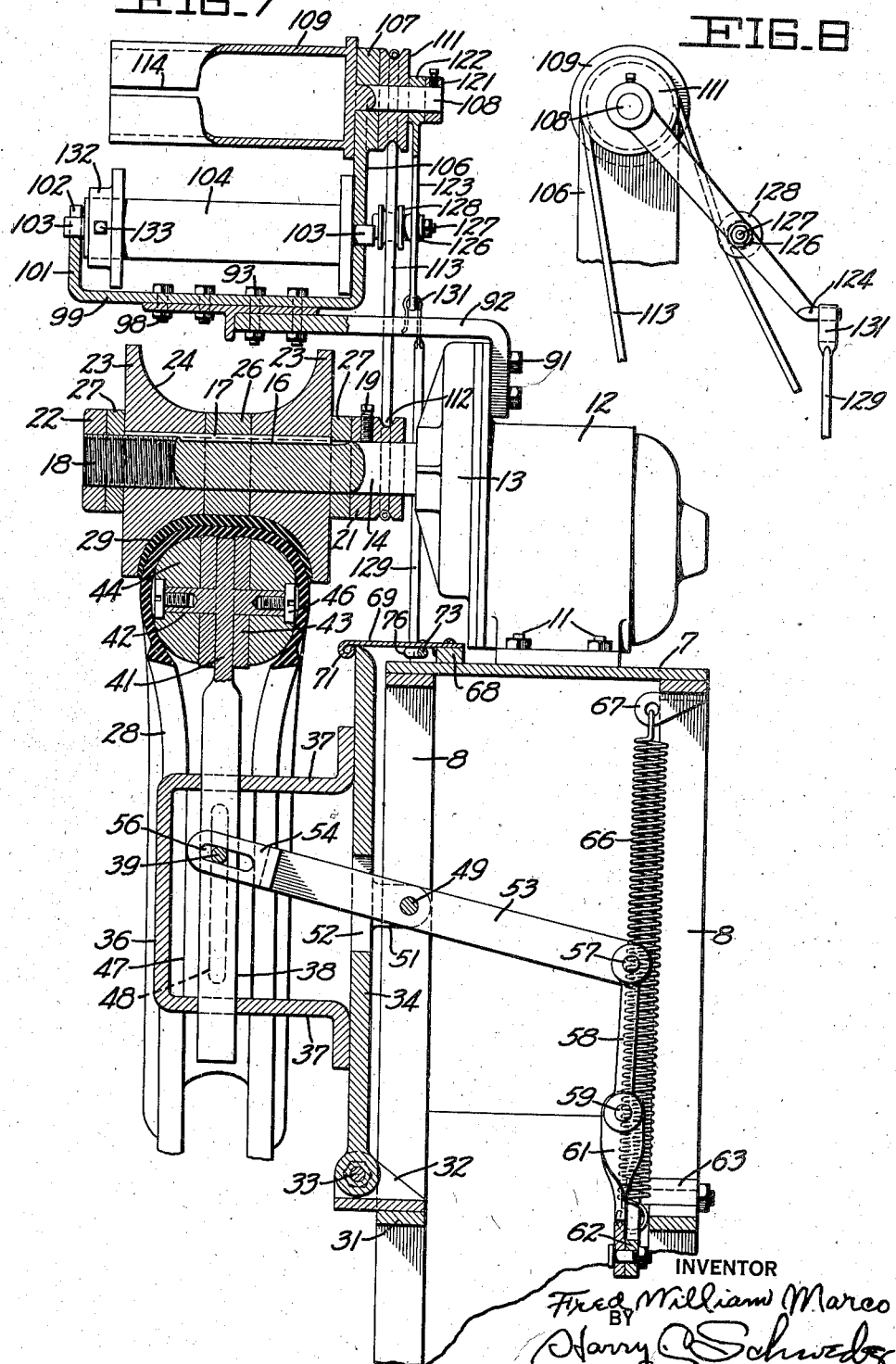

Patented June 21, 1938

2,121,252

UNITED STATES PATENT OFFICE 2,121,252

TIRE RETREADING MACHINE

Fred William Marco, Albany, Calif., assignor, by mesne assignments, to Kite Mold Company, Los Angeles, Calif., a corporation of California Application November 23, 1936, Serial No. 112,205

11 Claims. (Cl. 154—9)

This invention relates to mechanisms for applying strips of material to an object such as a pneumatic tire casing.

It is an object of the invention to facilitate the application of retreading material to prepared tire casings by providing a machine for applying the material, an operation which has formerly generally been accomplished by hand.

Another object of the invention is to provide mechanism which will insure that the retreading material is firmly pressed into contact with the tire casing thereby precluding the possibility of air being entrapped between the material and casing which, when the tire is placed in the vulcanizing mold, will prevent proper union of the rubber and create a blister in the finished tire.

Still another object of the invention is to provide a machine for the purpose described which will stretch the retreading material as it is being applied thereby permitting the use of a minimum amount of the latter to cover the casing and contributing to a material saving in said material.

A further object of the invention is to provide a machine of the character described which is readily and quickly adjustable to accommodate tire casings of various sizes.

A still further object of the invention is to provide a compact machine of the type referred to which occupies but a small amount of floor space.

Yet another object of the invention is to provide novel means for automatically removing the protective coating from the retreading material as and when the latter is used.

The invention possesses other objects and valuable features, some of which, together with the foregoing, will be specifically set forth in the detailed description of the invention which follows. It is to be understood that the invention is not to be limited to the particular species thereof shown and described as various other embodiments thereof may be employed within the scope of the appended claims.

Referring to the drawings:

Figure 3 is a top plan view, partly in section, of the mounting for the casing stabilizing rollers.

Figure 4 is a side elevational view of the complete machine showing the casing support in its extended position.

Figure 5 is a side elevational view, similar to Figure 4, showing the casing support in its retracted position.

Figure 6 is a perspective view of a portion of the machine detailing the casing support latch and its release mechanism.

Figure 7 is a vertical sectional view, to an enlarged scale, of the machine. The plane in which the view is taken is indicated by the line 7—7 of Figure 1.

Figure 8 is a fragmentary rear elevational view of the stripper roll and a portion of its drive mechanism.

Figure 1:
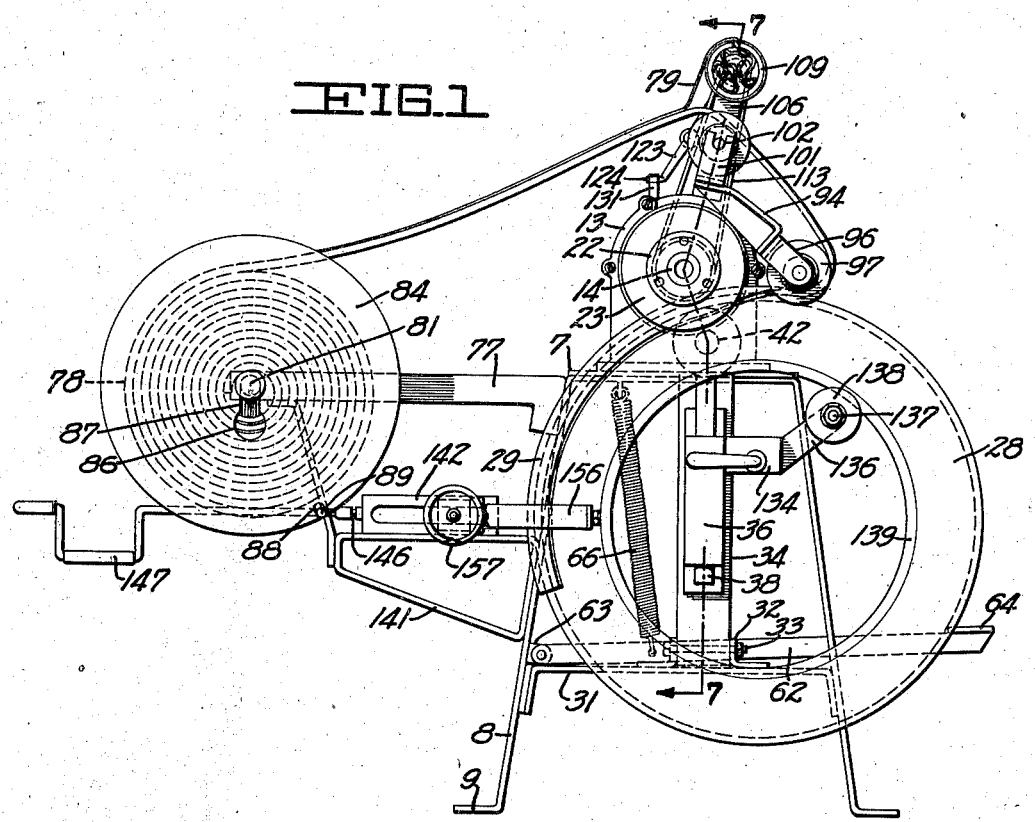
Figure 1 is a front elevational view of the complete retreading machine of my invention.
Figure 2:
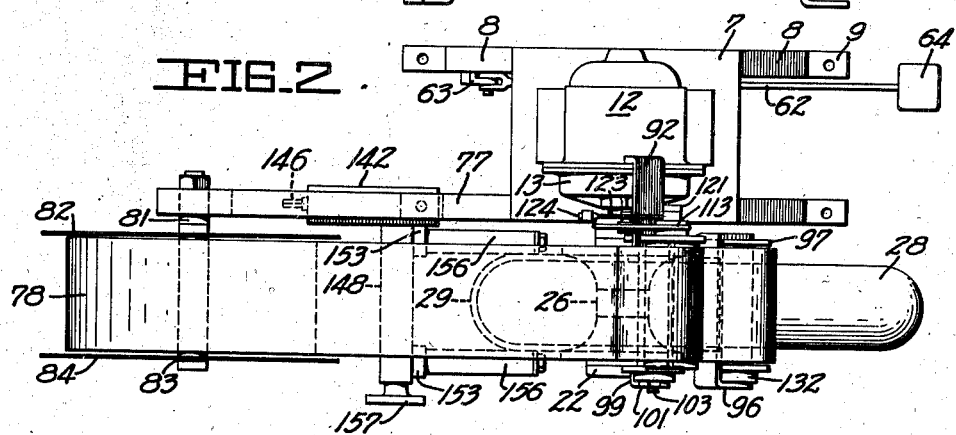
Figure 2 is a top plan view thereof.

At the present time there are numerous small concerns engaged in the business of providing tire casings, from which most of the original tread rubber has been worn, with a retread of new rubber so as to materially extend the normal useful life of the tire. In most of these small shops the volume of business does not warrant the expenditure of considerable sums of money for labor-saving tools and hence practically all of the work necessary to prepare each tire, preparatory to the actual vulcanizing process of bonding the new tread material to the casing, is done by hand. This hand work requires both the services of skilled well paid labor and considerable time and it is therefore evident that in order to compete with larger organizations, that can afford to equip their shops with labor-saving devices and hence are capable of greater production, the finished tires must be disposed of at a very small margin of profit. Quite often the tires produced by hand are imperfect, due to the sacrifice of care in construction, for production volume, with the result that the narrow margin of profit is further lessened. I have provided a low-priced device by means of which one of the time-consuming steps requiring great care in the retreading of a tire, that of placing the retread on the casing preparatory to vulcanizing, may be rapidly performed with the assurance that no imperfect bonding will occur, thereby enabling the operator of the small shop to materially increase his production and to compete on a more equitable basis with the larger concerns.

In detail, the retreading machine of my invention is provided with a stand comprising a plate 7 having attached thereto, and depending therefrom, opposed pairs of legs 8 each of which, at its lower end, is provided with an apertured foot 9 by means of which the stand may be bolted to the floor or a surface of any other suitable support.

Mounted on the plate 7 by the bolts 11, as is best shown in Figure 7, is an electric motor 12 on the front end of which is secured a housing 13 enclosing suitable reduction gearing which drives a horizontally extending shaft 14 provided with a keyway 16, which receives a long key 17, and at its outer end with threads 18. Secured to the shaft, adjacent the point of entry thereof into the reduction gear housing, by the setscrew 19 is a collar 21 and engaged with the threads 18 at the outer end of the shaft is a removable nut 22. Removably positioned on the shaft, and secured for rotation therewith by the key 17, is a tread roller comprising a pair of flanged collars 23 having opposed faces 24 thereof curved and facing each other to provide, on the periphery of the roller, a wide substantially semi-circular groove. Also disposed on the shaft are spacing washers 26 and 27, the former of which is located between the adjacent ends of the collars 23 and the latter of which are located respectively between the outer face of one of the collars 23 and the nut 22 and between the face of the innermost collar 23 and the collar 21. These spacing collars are provided in various thicknesses so that, by inserting a thicker collar 26 than that shown, the spacing between the flanged collars 23 is increased and consequently the width of the peripheral groove of the tread roller is also increased. Similarly, by removing the collar 26, or replacing it with one of lesser thickness, the width of the roller groove will be decreased. The collars 27 will, of course, also have to be changed to compensate for the increased or decreased thickness of the collar 26. The cross-sectional shape of the tread roller groove is made to conform substantially with the cross-sectional contour of a standard tire casing 28 upon which the layer of retread rubber 29 is to be secured.

Means are provided for supporting the tire casing and means are also provided for pressing the casing into the tread roller groove so that sufficient pressure is exerted to press the retread material into contact with the casing to insure that the desired bonding of the two elements occurs.

Carried on a cross-member 31, connecting the pair of front legs 8 together, is a bracket 32 supporting a pin 33 upon which is journaled the lower end of an arm 34. A U-shaped frame 36 is secured to the arm, and the opposed sides 37 of the former are each provided with apertures in which is slidably mounted a vertically disposed rod 38 having intermediate its ends a transverse pin 39 and, at its extreme upper end, a flattened head portion 41 from either side of which projects a pair of axially alined pins 42. Journaled on the pins 42 are disks 43 and 44 the latter of which are formed with substantially hemispherical peripheries conforming to the curvature of the tread roller collars 23, and screws 46 are tapped into the end of each pin 42 to maintain the disks on the pins. The assembly of disks 43 and 44 provide a pressure roll which is disposed inside of the casing 28 and maintains both the casing and the retreading material 29 in contact with the periphery of the tread roller. The disks 43 provide means for adjusting the width of the pressure roller, in the same manner that the tread roller is adjustable as to width, by the insertion of disks of greater or lesser thickness.

The frame 36 is provided, at each side thereof, with plates 47 each having therein a slot 48, extending parallel with the axis of the rod 38, in which the pin 39 is slidably engaged for the purpose of limiting the rod to axial movement and preventing rotational movement thereof. Thus the pressure roller will be maintained, during its movement toward and away from the periphery of the tread roller always in axial parallelism with the latter roller. Mounted for pivotal movement on a pin 49 carried by a bracket 51, formed on the arm 34 and passing through an aperture 52 formed in the latter member, is a lever 53 having at one end thereof a forked portion 54 straddling the rod 38 and provided with slots 56 in which the pin 39 is slidably engaged. The other end of the lever is provided with a pin 57 on which is pivotally secured one end of a link 58 the opposite end of which is pivotally secured, by the pin 59, to a strap 61 carried by a treadle lever 62 whose rear end is pivotally mounted on one of the stand legs 8 by the bracket 63 and the forward end of which is provided with a treadle pad 64. A spring 66, secured at one end to the treadle lever and at the other end to a bracket 67 mounted adjacent the top of the stand, serves to maintain the treadle lever in its elevated position. When pressure is applied to the pad 64, to urge the treadle lever downwardly, the lever 53 will be moved about its pivot and the rod and pressure roller will be urged upwardly toward the tread roller. The degree of pressure with which the pressure roller squeezes the casing 28 and the tread material 29, between its periphery and that of the tread roller, is governed of course by the downward pressure applied to the treadle pad 64.

Means is provided for latching the pressure roller and its supporting structure in their normal operating position shown in Figures 5 and 7 or for unlatching the elements to permit movement into their extended position, shown in Figure 4, wherein the tire casing may be readily mounted on or removed from the pressure roller. The upper end of the arm 34 extends slightly above the upper surface of the plate 7 and is rounded on the side thereof facing the stand. Fixed to a block 68, secured to the plate 7, is a resilient latch arm 69 provided with a rolled outer edge 71. When the pressure roller mounting is moved from the extended position, in which it is shown in Figure 4, to its normal operating position, the rounded end of the arm 34 will contact the rounded end 71 of the latch arm and cause the latter to ride over the end of the arm 34, thereafter snapping into contact with the outer face of the arm 34 and holding the latter in upright position until released. Means is provided for releasing the latch to allow the pressure roller mounting to return to its extended position. Mounted for rotary movement in journals 72, bolted to the top of the plate 7, is a shaft 73 one end of which is bent upwardly to provide an operating lever 74 and the portion of the shaft underlying the latch arm being axially offset to provide a crank 76. By moving the lever 74 to the right, as viewed in Figure 6, the shaft will be rotated causing the offset portion 76 of the latter to raise the latch arm 69 and disengage the rolled end portion 71 thereof from the end of the arm 34 whereupon the latter is free to pivot about the axis of the pin 33 and return to its extended position.

Means is provided for guiding the tread material 29 between the tread roller and the tire casing. Supported at the distal end of an arm 77, secured to the stand, is a reel for supporting a roll 78 of strip rubber tread material which is coated on one surface thereof with a layer of gum rubber to more readily effect the bond between the tread material and the casing and a protective covering 79 of fabric or heavy paper is provided for the gum coating. The reel comprises a stud 81 which is fixed to the end of the arm 77 and is provided with an inner plate 82 fixedly mounted thereon. The outer end of the stud is provided with a peripheral groove 83 which removably receives the front plate 84, the latter plate being provided with an aperture 86 from which a notch 87 extends radially to terminate at the center of the plate. The aperture 86 is sufficiently large to pass over the stud 81 and the notch 87 has a width equal to the diameter of the bottom of the peripheral groove 83 of the stud. When a roll of tread material has been placed on the stud the plate 84 is placed thereon with the stud entering the aperture 86. The plate is now moved toward the rear of the stud until the notch 87 coincides with the groove 83 whereupon the plate is allowed to descend so that the edges of the notch will be engaged by the groove. This is clearly shown in Figure 1. To prevent rotation of the front plate 84 on the stud, the former is provided with a peripheral notch 88 which engages a rod 89 secured to and extending from the rear plate 82.

Attached to the rear of the reduction gear housing 13, by bolts 91, and extending over and above the tread roller is a bracket 92 to which is secured, by bolts 93, a support arm 94 extending, as is shown in Figure 1, downwardly and provided at its lower end with a bracket 96 which provides a mounting on which the lower flanged guide spool 97 is journaled. Also secured, by bolts 98, to the support arm 94, adjacent the point of attachment of the latter with the bracket 92, is a bracket 99 whose front vertically disposed portion 101 is provided at its upper end with a notch 102 in which is journaled the stub shaft 103 of the upper flanged guide spool 104. The rear vertically disposed portion 106 of the bracket 99 is also apertured to provide a journal for the stub shaft 103, extends upwardly from this journal, and is provided with a boss 107 which is centrally bored to provide a journal for the shaft 108 of the hollow cylindrical stripper roll 109. While both the upper and lower guide spools 104 and 97 respectively are idlers, the stripper roll is driven in synchronism with the rotational speed of the tread roller, the driving connection being provided by a grooved pulley 111 which is secured for rotation with the shaft 108, a groove 112 formed in the periphery of the collar 21, and a belt 113 which tractionally engages in each of the grooves.

In Figure 1 it will be seen that the strip of tread material from the supply roll 78 is led over the upper guide spool 104 and thence downwardly under the lower guide spool 97 and between the tread roller and the tire casing. The layer of protective fabric or paper 79 is, as the material passes over the upper guide spool, stripped from the material and wound upon the stripper roll 109. The attachment of the material 79 to the roll is effected by passing the end of the former through an axial slot 114 formed in the roll.

In operation, the tire casing 28 is first denuded of all of the old tread rubber so as to provide a clean and suitably roughened surface to receive the new tread material. The prepared surface of the casing is now given a coating of rubber cement which is allowed to set sufficiently so as to become quite tacky. The pressure roller support is now moved to its extended position, shown in Figure 4, and the casing is placed thereon so that the pressure roller will be within it as is shown in Figure 7. The pressure roller mounting is now moved toward the stand until it is latched in its upright position. The free end of the tread material is now brought from the supply roll, the protective fabric 79 is manually stripped back from the rubber a few feet from the end of the strip, the fabric is secured in the slot of the stripper roll 109 and the end of the rubber strip is manually placed on and stretched transversely over the periphery of the tire casing. The casing is now rotated slightly to place the end of the rubber strip under the tread roller whereupon the operator depresses the treadle 64 thereby bringing the pressure roller upwardly to squeeze the casing and the tread material against the periphery of the tread roller. The motor 12 is now energized which will rotate the tread roller and cause rotation of the casing, causing the tread material to be drawn from the supply roll and fed between the casing and the tread roller. The motor is kept running until the casing has made a complete revolution whereupon the tread material is cut and the casing is further revolved to "iron" the tread material thereon so as to insure that any entrapped air between the casing and the tread material is squeezed out, thereby insuring a perfect bond between the joined surfaces. The contour of the peripheral groove of the tread roller effects a stretching of the tread material laterally of the casing so as to remove any wrinkles from the tread and to insure a proper distribution of the rubber so that, when the casing is placed in the vulcanizing mold to receive its final non-skid design, there will be the correct amounts of rubber on all areas of the casing.

Means are provided for releasing the tension on the stripper roll belt 113 when the "ironing" process is being performed on the casing so as to prevent stripping of the protective covering from the tread material when the latter is not being used. Journaled on the stripper roll shaft 108, and secured thereon by a collar 121 is a hub 122 from which depends an arm 123 terminating at its lower end in a lug 124. Intermediate the ends of the arm 123 is a boss 126 centrally apertured to receive a pin 127 on which is journaled a grooved idler roller 128. This roller, as is shown in Figure 3, is positioned to contact the belt 113 and deflect it inwardly so that a maximum of tractive effort will be exerted thereby in the grooves of the pulley 111 and the collar 21, and for removably maintaining the roller in this position a resilient post 129 is provided suitably supported on the plate 7 and provided at its upper end with a U-shaped clip 131 in which the lug 124 of the arm 123 is engaged. The arrangement of the parts is such that, when the arm 123 is disengaged from the clip 131 and the former is free to swing outwardly, the tension on the belt will be released and there will be insufficient traction between the belt and the pulley 111 to rotate the latter to cause further stripping of the protective covering 79 from the tread material 29. Thus when the operator desires to rotate the covered casing, he releases the connection between the end of the arm 123 and the clip 131. When it is desired to again strip the protective covering from the tread material as the latter is being used, the connection between the arm 123 and the clip must be restored.

Since the width of the tread material varies for different sizes of tires I provide means for adjusting the width of the guide rollers this being accomplished by providing each with a flanged outer collar 132 having a setscrew 133 for adjustably positioning the collar axially of the roller.

Means are provided for affording transverse stability to the casing as it is rotated to insure that the tread material is correctly applied to the periphery thereof. Extending from a bracket 134, secured to the pressure roller support, is an arm 136 provided at its outer end with a pin 137 upon which is journaled a pair of grooved guide rollers 138 which engage the bead 139, of the casing so as to maintain the casing, when the latter is rotating, in a vertical plane.

Mounted on a bracket 141, secured to one of the front legs 8, is a guide mechanism, best shown in Figure 3, and comprising a hollow casing 142 provided in its end walls 143 with apertures which provide journals for a feed screw 144 having at one end thereof a squared portion 146 which is adapted to receive the socket of the speed wrench 147, shown in Figure 1, by means of which the screw 144 may be rotated. Slidably mounted in the casing, and threadedly engaged with the screw 144, is an arm 148 having a hollow section 149 therein in which is rotatably mounted a shaft 150 having, respectively, right and left hand threads 151 and 152 thereon. Threadedly engaged with each of the screw threads 151 and 152 are blocks 153 each having a tapped aperture therein which receives the threaded end of a stub shaft 154 upon which is journaled a roller 156. The outer end of the shaft 150 is provided with a knurled handwheel 157 by means of which the shaft may be rotated. It will be seen that by rotating the handwheel 157 the rollers 156 may be brought closer together or spread further apart depending upon the size of the tire that the machine is operating upon, and that by rotating the screw 144 the rollers may be shifted axially with respect to the casing to accommodate different diameters of the latter. The rollers 156 function not only to maintain the casing in a vertical plane while it is being rotated, but also, as will be observed in Figure 1, serve to iron out the edges of the tread as it is applied to the casing to lessen the likelihood that the bond between the latter and the tread will part.

With the machine of my invention, just described, it is possible to perform the heretofore painstaking operation of applying the tread material to the prepared casing very rapidly and with the assurance that each tread will be applied uniformly, in correct register with the casing, and without flaws such as blisters caused by entrapping air between the tread and casing to prevent perfect bonding therebetween. It will also be seen that the machine is capable of being produced to sell economically so that it is within the reach of small shop owners and that the output of such shops can be materially increased since a single machine and operator can handle the casings as fast as several workmen can prepare them.

I claim:

1. A tire retreading machine comprising a stand, a driven roller supported on said stand, a frame pivotally mounted on said stand, an idler roller, upon which a tire casing may be supported, rotatably mounted on said frame, said frame and idler roller being movable from a position adjacent said driven roller to a position removed therefrom, and means for guiding a strip of material between said driven roller and said casing when said frame and idler roller are in said position adjacent said driven roller.

2. A tire retreading machine comprising a stand, a driven roller supported on said stand, a frame pivotally mounted on said stand, an idler roller, upon which a tire casing may be supported, rotatably mounted on said frame, said frame and idler roller being movable from a position adjacent said driven roller to a position removed therefrom, means for guiding a strip of material between said driven roller and the outer surface of said casing when said frame and idler roller are in said position adjacent said driven roller, and means for latching said frame and idler roller in said latter position.

3. A tire retreading machine comprising a stand, a driven roller supported on said stand, a frame pivotally mounted on said stand, an idler roller, upon which a tire casing may be supported, rotatably mounted on said frame, means for guiding a strip of material between said driven roller and the surface of said casing, means for moving said idler roller and said casing toward said driven roller to compress said strip of material between the casing and the surface of said latter roller, and said frame, idler roller, and the casing supported thereby being movable about the pivotal axis of said frame from a position adjacent said driven roller to a position removed therefrom.

4. A tire retreading machine comprising a stand, a driven roller having a peripheral groove therein supported on said stand, means for supporting a tire casing in tractional engagement with said driven roller within the groove thereof whereby said casing will be rotated by said roller, a reel for supporting a strip of material on said stand, a plurality of guide rollers for guiding said strip from said reel between the contacting surfaces of said casing and said driven roller, and means for adjusting the lengths of said driven roller and said guide rollers to accommodate different widths of said strip material.

5. A tire retreading machine comprising a stand, a driven roller having a peripheral groove therein supported on said stand, means for supporting a tire casing in tractional engagement with said driven roller within the groove thereof whereby said casing will be rotated by said roller, means for adjusting the length of said driven roller to increase and decrease the width of said groove, a reel for supporting a strip of material on said stand, means for guiding said strip from said reel between the contacting surfaces of said casing and said driven roller, a pair of pulleys each having a peripheral groove therein for engaging the beads of said tire casing to provide transverse stability for said casing as the latter is rotated, and a pair of stabilizing rollers rotatably mounted on said stand and contacting opposed portions of the outer surface of said casing.

6. A tire retreading machine comprising a stand, a driven roller having a peripheral groove therein supported on said stand, means for supporting a tire casing in tractional engagement with said driven roller within the groove thereof whereby said casing will be rotated by said roller, means for adjusting the length of said driven roller to increase and decrease the width of said groove, a reel for supporting a strip of material on said stand, means for guiding said strip from said reel between the contacting surfaces of said casing and said driven roller, a pair of pulleys each having a peripheral groove therein for engaging the beads of said tire casing to provide transverse stability for said casing as the latter is rotated, a pair of stabilizing rollers rotatably mounted on said stand and contacting opposed portions of the outer surface of said casing, means for moving said stabilizing rollers axially toward and from the center of rotation of said casing, and means for varying the axial spacing between said rollers.

7. A tire retreading machine comprising a stand, a driven roller supported on said stand, a frame pivotally mounted on said stand, a rod slidably mounted for axial movement in said frame, an idler roller journaled on said rod upon which a tire casing may be supported, a lever pivotally mounted on said frame, said lever being operatively connected, at one end thereof with said rod, a link connected with the other end of said lever, a treadle lever connected with said link, said treadle lever being movable to move said rod axially and urge said idler roller and said casing into contact with said driven roller, and means for guiding a strip of material between the contacting surfaces of said casing and said driven roller.

8. A tire retreading machine comprising a stand, a driven roller having a peripheral groove therein supported on said stand, a frame pivotally mounted on said stand, an idler roller, upon which a tire casing may be supported, rotatably mounted on said frame, said frame and idler roller being movable from a position adjacent said driven roller to a position removed therefrom, means for moving said idler roller to enter the peripheral groove of said driven roller to move said tire casing into tractional engagement with said driven roller, and means for guiding a strip of material between said driven roller and said casing when said frame and idler roller are in the position adjacent said driven roller.

9. A tire retreading machine, comprising a stand, a driven roller having a peripheral groove therein supported on said stand, a frame pivotally mounted on said stand, an idler roller, upon which a tire casing may be supported, rotatably mounted on said frame, said frame and idler roller being movable in a direction axially of said driven roller from a position adjacent the latter roller to a position removed therefrom, means for moving said idler roller radially of said driven roller into and out of the peripheral groove of the latter roller to move said tire casing into tractional engagement with said driven roller, and means for guiding a strip of material between said driven roller and said casing when said frame and idler roller are in the position adjacent said driven roller.

10. A tire retreading machine comprising a stand, a driven roller supported on said stand, said driven roller having a peripheral groove therein complemental to the periphery of a tire casing, an idler roller movably mounted on said stand and positioned adjacent said driven roller, said idler roller being adapted for entry into said tire casing, means for moving said idler roller and said tire casing thereon radially of said driven roller into and out of the peripheral groove thereof, a reel carried by said stand containing a strip of resilient material having a protective layer of sheet material secured to a surface thereof, a stripper roller journaled on said frame upon which said layer of sheet material may be wound, means connecting said stripper roller and said driven roller for rotation together, and means for disconnecting said rollers.

11. A tire retreading machine comprising a stand, a driven roller supported on said stand, said driven roller having a peripheral groove therein complemental to the periphery of a tire casing, an idler roller movably mounted on said stand and positioned adjacent said driven roller, said idler roller being adapted for entry into said tire casing, means for moving said idler roller and said tire casing thereon radially of said driven roller into and out of the peripheral groove thereof, a reel carried by said stand containing a strip of resilient material having a protective layer of sheet material secured to a surface thereof, a stripper roller journaled on said frame upon which said layer of sheet material may be wound, a belt connecting said stripper roller and said driven roller, and means for varying the tension of said belt to connect said stripper and driven rollers for rotation together.

FRED WILLIAM MARCO.